W. WHITE.
INCANDESCENT LAMP.
APPLICATION FILED OCT. 8, 1918.

1,331,301.                    Patented Feb. 17, 1920.

Witnesses
K. A. Thomas
J. W. Garner

Inventor
William White
By Victor J. Evans
Attorney

UNITED STATES PATENT OFFICE.

WILLIAM WHITE, OF ROSSVILLE, GEORGIA, ASSIGNOR OF ONE-HALF TO SAM. M. HARVEY, OF CHATTANOOGA, TENNESSEE.

INCANDESCENT LAMP.

1,331,301.  Specification of Letters Patent.  Patented Feb. 17, 1920.

Application filed October 8, 1918. Serial No. 257,372.

*To all whom it may concern:*

Be it known that I, WILLIAM WHITE, a citizen of the United States, residing at Rossville, in the county of Walker and State of Georgia, have invented new and useful Improvements in Incandescent Lamps, of which the following is a specification.

This invention relates to improvements in incandescent lamps and especially with reference to improvements in the mounting and arrangement of filaments therein, the object of the invention being to provide an improved incandescent lamp which throws rays of light in a large number of directions producing a clear, bright and perfectly diffused light and requiring only a current of moderate voltage in its operation.

With the above and other objects in view, the invention consists in the construction, combination and arrangement of devices hereinafter described and claimed.

Figure 1:
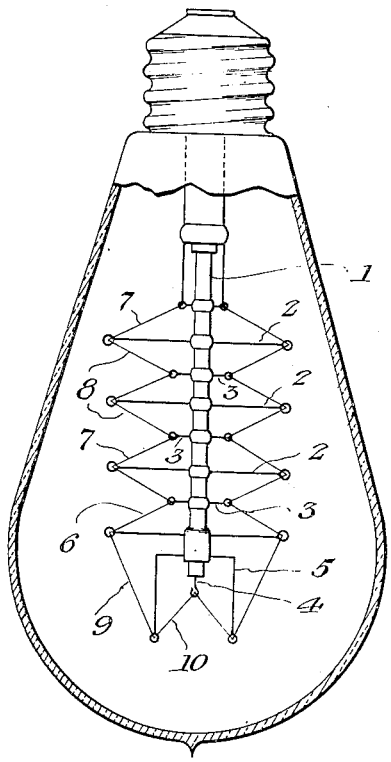
Figure 1 is a sectional view of an incandescent lamp constructed and arranged in accordance with my invention.

Referring first to the form of the invention shown in Fig. 1, the glass support is indicated at 1 and is provided with relatively long holder wires 2 and relatively short holder wires 3 which project laterally from the support and arranged alternately. At its outer end the support is provided with a holder hook 4 and also with an inverted U-shaped holder wire 5. The filaments 6, which may be made of tungsten or other suitable material, are engaged by the holder wires and are arranged thereby in oppositely inclined outwardly converging planes 7, 8. The portions 7 of the filaments are inclined downwardly and outwardly and serve to throw rays of light upwardly and downwardly and the upwardly and outwardly inclined portions 8 of the filaments also throw rays of light outwardly and downwardly but in planes nearly at right angles to those of the portions 7 so that the rays extend in a number of different directions and a perfectly diffused light is produced. Those portions of the filaments between the lowermost holder wire 2 and the ends of the inverted U-shaped holder wire 5 are downwardly and inwardly inclined and are arranged at an angle to the portions 7 and throw rays of light at a correspondingly different angle. The portions 10 of the filaments between the ends of the holder 5 and the holder hook 4 are oppositely inclined, converge upwardly, and are arranged at a different angle and throw rays of light at corresponding angles through the bottom of the bulb.

Figure 2:
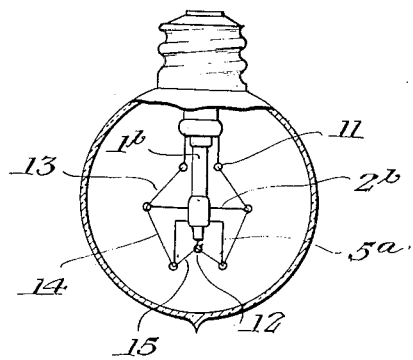
Fig. 2 is a similar view showing a modification of the invention.

In the form of the invention shown in Fig. 2 in which the lamp is of relatively small size, only one straight holder wire 2ᵇ is employed in addition to the inverted U-shaped holder wire 5ᵃ, the filaments being connected to the terminal wires of the lamp at 11 at points a slight distance from the glass support 1ᵇ and being connected to the ends of the holder wires 2ᵇ, 5ᵇ, and also to the lower end of the glass support as at 12 so that the filaments are arranged in oppositely inclined downwardly diverging portions 13, oppositely inclined upwardly converging portions 15, said portions 13, 14 and 15 being all at different angles so that the light is thoroughly diffused.

While I have herein shown and described a preferred embodiment of my invention, I would have it understood that changes may be made in the form, proportion and construction of the several parts without departing from the spirit of my invention and within the scope of the appended claims.

Having thus described my invention, I claim:

1. In an incandescent lamp, a support, holder wires of unequal length arranged alternately and extending laterally from the support, filaments carried by the outer ends of the said wires and arranged thereby in oppositely inclined outwardly converging planes, and holders at the lower end and extending below the lower end of the support and arranging the corresponding portions of the filaments in oppositely inclined downwardly diverging planes.

2. In an incandescent lamp, a support, holder wires of unequal length arranged alternately and extending laterally from the support, filaments carried by the outer ends of said wires and arranged thereby in oppositely inclined outwardly converging planes, a hook at the lower end of said support, and an inverted U-shaped holder secured upon and extending beyond the lower end of said support, said filaments being engaged upon the ends of said inverted U- shaped holder and said hook whereby to arrange the corresponding portions of the filaments in oppositely inclined downwardly diverging planes.

3. In an incandescent lamp, a support, holder wires of unequal length extending laterally from said support, filaments carried by the outer ends of said wires and arranged thereby in oppositely inclined planes, a hook at the lower end of said support, and an inverted U-shaped holder secured upon and extending beyond the lower end of said support, said filaments being engaged upon the ends of said holder and said hook.

4. In an incandescent lamp, a support, holder wires extending laterally from said support, filaments carried by the outer ends of said wires and arranged thereby in oppositely inclined planes, a hook at the lower end of said support, and an inverted U-shaped holder secured upon the lower end of said support, said filaments being engaged upon the ends of said holder and said hook.

In testimony whereof I affix my signature.

WILLIAM WHITE.